S. A. TRAUGH.
Car Wheel.
No. 71,247.                Patented Nov. 19, 1867.
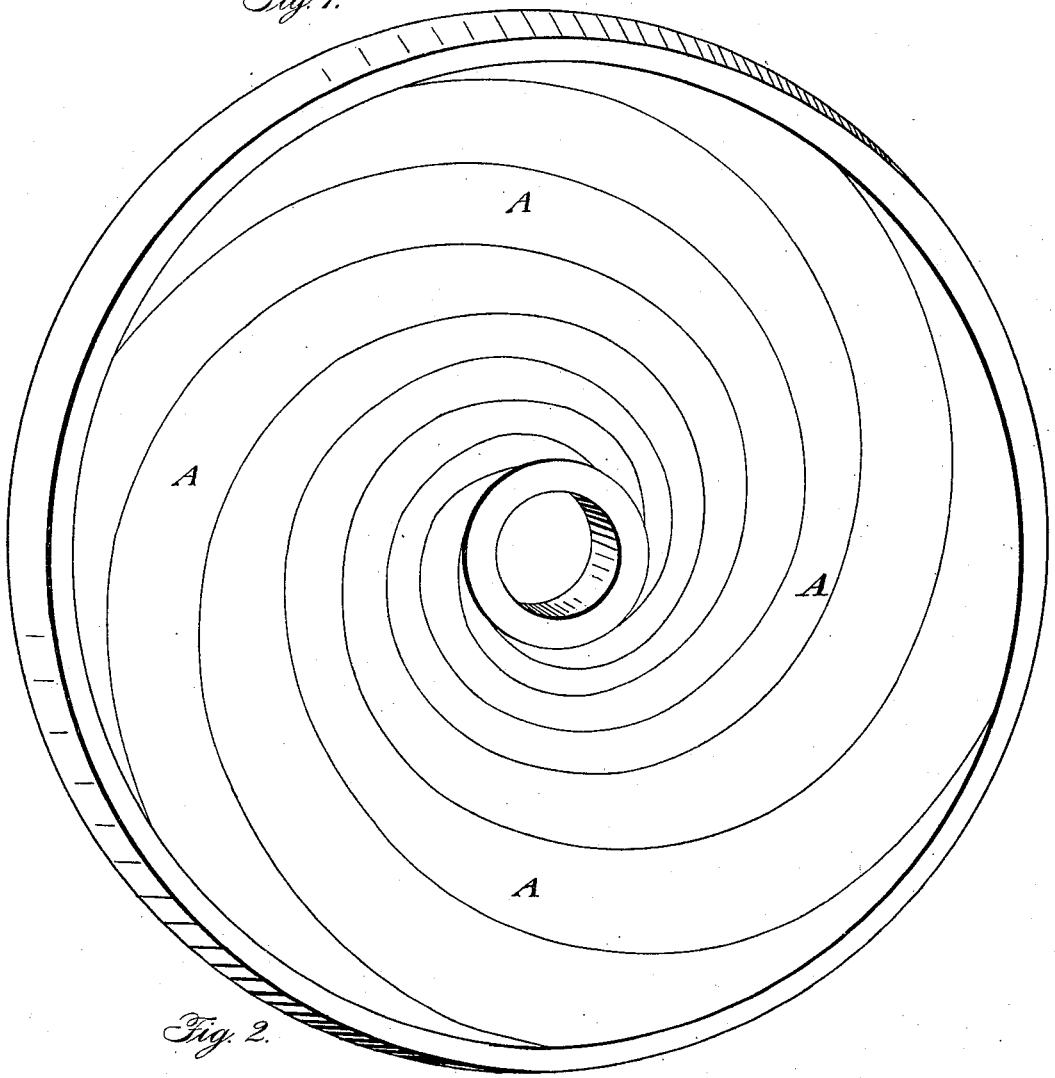
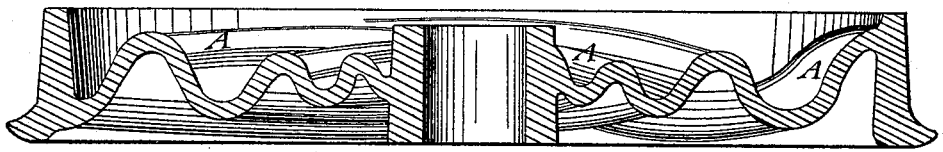
Witnesses:              Inventor:

United States Patent Office.

SAMUEL A. TRAUGH, OF CINCINNATI, OHIO, ASSIGNOR TO HIMSELF AND JEPTHA GARRARD, OF THE SAME PLACE.

Letters Patent No. 71,247, dated November 19, 1867.

IMPROVED CAR-WHEEL.

*The Schedule referred to in these Letters Patent and making part of the same.*

TO WHOM IT MAY CONCERN:

Be it known that I, SAMUEL A. TRAUGH, of Cincinnati, Hamilton county, Ohio, have invented a new and useful Improvement in Cast Wheels; and I hereby declare the following to be a full, clear, and exact description thereof, reference being had to the accompanying drawings, making part of this specification.

This invention relates to an improvement in car and other wheels of cast metal, securing great strength and economy of material, and being especially free from liability to strain and fracture incident to unequal expansion and contraction in cooling, or by collision with other objects.

Figure 1 is a perspective view of a cast car-wheel embodying my invention.

Figure 2 is an axial section of the same.

The distinguishing feature of novelty in my invention consists in forming the web, or part joining the hub, with the tire or rim, of a single plate, composed of a series of equidistant volute folds, scrolls, or undulations, A, which extend from the periphery of the hub, with gradually diverging and more open sweep and increasing undulation, so as to reach the tire at a point coradial, or nearly so, with that of departure. These convolutions are substantially such as would be generated from a flexible disk by imparting to its periphery a complete revolution while the centre was held stationary. The depressions on one side corresponding to the elevations on the other side, the entire web is of equal or nearly equal thickness and undulation, and wholly devoid of either planes or angles. This web is believed, from its high and uniform elasticity, pre-eminently adapted to resist liabilities to fracture arising from sudden changes of temperature, molecular deterioration, or mechanical violence.

I claim herein as new, and of my invention—

A cast-wheel, whose web is composed of the undulating scrolls or convolutions A, formed and arranged as and for the purpose described.

In testimony of which invention, I hereunto set my hand.

SAMUEL A. TRAUGH.

Witnesses:
 JNO. H. KNIGHT,
 PHIL. G. WEATHERBY.